United States Patent
Meyer

(10) Patent No.: US 12,187,206 B2
(45) Date of Patent: Jan. 7, 2025

(54) POWER CABLE FOR MOTOR VEHICLES AND A METHOD FOR BENDING A POWER CABLE FOR MOTOR VEHICLES

(71) Applicant: Auto-Kabel Management GmbH, Hausen i.W. (DE)

(72) Inventor: Bernd Meyer, Schwörstadt (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 213 days.

(21) Appl. No.: 17/773,768

(22) PCT Filed: Aug. 13, 2020

(86) PCT No.: PCT/EP2020/072727
§ 371 (c)(1),
(2) Date: May 2, 2022

(87) PCT Pub. No.: WO2021/089209
PCT Pub. Date: May 14, 2021

(65) Prior Publication Data
US 2022/0396223 A1  Dec. 15, 2022

(30) Foreign Application Priority Data
Nov. 7, 2019  (DE) ..................... 10 2019 130 078.9

(51) Int. Cl.
*B60R 16/03* (2006.01)
*H01B 9/00* (2006.01)

(52) U.S. Cl.
CPC ............. *B60R 16/03* (2013.01); *H01B 9/006* (2013.01)

(58) Field of Classification Search
None
See application file for complete search history.

(56) References Cited

U.S. PATENT DOCUMENTS 1,018,399 A * 2/1912 Livingston ............. B21D 13/04
                                                          72/379.6
1,357,739 A * 11/1920 Steenstrup ............. B23P 13/00
                                                          228/183
(Continued)

FOREIGN PATENT DOCUMENTS

BE    1017756 A6 *  6/2009  ............. B21D 11/00
BR    0315121  A *  8/2005
(Continued)

OTHER PUBLICATIONS

Translation of H0788564 (Year: 1995).*
(Continued)

*Primary Examiner* — Timothy J. Dole
*Assistant Examiner* — Muhammed Azam
(74) *Attorney, Agent, or Firm* — Sunstein LLP

(57) ABSTRACT

A motor vehicle power cable comprising a flat conductor having an at least rectangular profile, wherein the flat conductor extends along a longitudinal axis, a vertical axis extending along a surface normal of a wide surface of the flat conductor, and a transverse axis extending along a surface normal of a narrow surface of the flat conductor and the flat conductor is bent about the vertical axis and having an inner bend radius and an outer bend radius, characterized in that the flat conductor has at least one forming about the longitudinal axis in the region of the inner bending radius at its inner side edge arranged at the inner bending radius.

10 Claims, 13 Drawing Sheets

(56) References Cited

U.S. PATENT DOCUMENTS

| | | | | |
|---|---|---|---|---|
| 1,773,908 | A | * | 8/1930 | Knowlton ................ B21D 7/00 72/166 |
| 1,819,636 | A | * | 8/1931 | Cain ..................... B21D 15/04 72/401 |
| 2,235,090 | A | * | 3/1941 | Stall ...................... B21D 19/08 126/214 B |
| 2,243,402 | A | * | 5/1941 | Trainer ................. B21D 53/02 428/602 |
| 2,244,427 | A | * | 6/1941 | Miller .................... F16L 41/08 411/522 |
| 2,716,805 | A | * | 9/1955 | Reed ..................... B21C 23/14 72/264 |
| 2,732,615 | A | * | 1/1956 | Sandberg .............. B21D 53/08 29/890.038 |
| 3,144,705 | A | * | 8/1964 | Anderson .............. F16H 55/50 29/512 |
| 3,636,690 | A | * | 1/1972 | White ................... B21D 11/08 72/409.18 |
| 3,730,567 | A | * | 5/1973 | Webster .............. F16L 19/0206 285/382.4 |
| 6,096,978 | A | * | 8/2000 | Pohjola .................. H01B 7/06 156/48 |
| 8,586,193 | B2 | * | 11/2013 | Rapp ..................... B21D 13/08 72/379.6 |
| 2002/0026709 | A1 | * | 3/2002 | Reichinger ......... B60R 16/0207 156/289 |
| 2002/0151210 | A1 | * | 10/2002 | Singh ................... H01R 12/774 439/495 |
| 2004/0000424 | A1 | * | 1/2004 | Mori ..................... H01R 12/772 174/145 |
| 2004/0007040 | A1 | * | 1/2004 | Ibron ................... B21C 37/151 72/379.2 |
| 2007/0221365 | A1 | * | 9/2007 | Martin .................. F28D 1/0478 165/150 |
| 2015/0180144 | A1 | * | 6/2015 | Martens .............. H01R 11/288 439/503 |
| 2017/0213620 | A1 | * | 7/2017 | Lausch ................... H01B 7/08 |
| 2019/0161032 | A1 | * | 5/2019 | Einert ................ B60R 16/0207 |
| 2019/0176723 | A1 | * | 6/2019 | Yamashita .......... B60R 16/0215 |
| 2019/0319375 | A1 | * | 10/2019 | Scharkowski ..... H01R 43/0207 |
| 2020/0098489 | A1 | * | 3/2020 | Kogure ............... H01B 7/0892 |
| 2020/0130516 | A1 | * | 4/2020 | Schwarz ................. B60L 50/64 |
| 2020/0227897 | A1 | * | 7/2020 | Abe ........................ H01B 7/08 |
| 2021/0044071 | A1 | * | 2/2021 | Mathews ............... H01R 11/26 |
| 2021/0126322 | A1 | * | 4/2021 | Scharkowski ...... H01M 50/503 |
| 2021/0265748 | A1 | * | 8/2021 | Scharkowski ......... H01R 4/029 |
| 2022/0085523 | A1 | * | 3/2022 | Scharkowski ......... H01R 4/029 |
| 2023/0198176 | A1 | * | 6/2023 | Sebetlela ........... H01R 43/0207 439/874 |

FOREIGN PATENT DOCUMENTS

| | | | | |
|---|---|---|---|---|
| CA | 2587257 | A1 | * | 4/2006 |
| CH | 624318 | A5 | * | 7/1981 |
| CN | 1176882 | A | | 3/1998 |
| CN | 1558802 | A | | 12/2004 |
| CN | 109065220 | A | * | 12/2018 |
| CN | 109127883 | A | * | 1/2019 ............ B21D 28/02 |
| CN | 109955487 | A | * | 7/2019 .............. B21D 7/00 |
| CN | 110116614 | A | | 8/2019 |
| CN | 111883949 | A | * | 11/2020 |
| CN | 111922141 | A | * | 11/2020 |
| CN | 112139316 | A | * | 12/2020 |
| CN | 112756442 | A | * | 5/2021 ............ B21B 15/00 |
| CN | 112974587 | A | * | 6/2021 |
| CN | 113732198 | A | * | 12/2021 ............ B21D 53/06 |
| DE | 1 765 770 | A1 | | 8/1971 |
| DE | 26 22 082 | B1 | | 11/1977 |
| DE | 4210202 | A1 | * | 9/1993 ........... H01B 7/0009 |
| DE | 100 51 269 | A1 | | 6/2001 |
| DE | 10 2006 050 705 | A1 | | 4/2008 |
| DE | 10 2014 011 180 | A1 | | 2/2016 |
| DE | 10 2014 011 229 | A1 | | 2/2016 |
| DE | 102017114579 | A1 | * | 1/2019 ......... B60R 16/0207 |
| DE | 202020106149 | U1 | * | 12/2020 ........... B60N 2/5657 |
| DE | 102020100289 | A1 | * | 7/2021 |
| EP | 0 133 256 | A2 | | 2/1985 |
| EP | 0826439 | A1 | * | 3/1998 |
| EP | 3 531 429 | A1 | | 8/2019 |
| GB | 797914 | A | * | 7/1958 |
| IT | 1069692 | B | * | 3/1985 ............. B01D 53/86 |
| JP | H0788564 | A | * | 4/1995 |
| JP | 2018101600 | A | * | 6/2018 ........... B21C 37/155 |
| KR | 20020052995 | A | * | 7/2002 |
| KR | 101490418 | B1 | * | 2/2015 |
| KR | 101590181 | B1 | * | 1/2016 |
| KR | 101747309 | B1 | * | 6/2017 |
| KR | 20180106244 | A | * | 10/2018 |
| KR | 20210028217 | A | * | 3/2021 |
| KR | 20210058495 | A | * | 5/2021 |
| WO | WO-8203574 | A1 | * | 10/1982 |
| WO | WO-2008102477 | A1 | * | 8/2008 ............... B21D 7/06 |
| WO | WO-2015182549 | A1 | * | 12/2015 ............... B21D 7/08 |

OTHER PUBLICATIONS

National Intellectual Property Administration, PRC, Notification of First Office Action, Application No. 202080077496.6, dated May 17, 2023, 14 pages.

International Searching Authority/EP, International Search Report and Written Opinion of the International Searching Authority, Application No. PCT/EP2020/072727, mailed Nov. 24, 2020, 14 pages (with English translation of the International Searching Authority).

German Patent Office, Office Action, Application No. 10 2019 130 078.9, mailed Aug. 4, 2020, 11 pages (in German).

* cited by examiner

POWER CABLE FOR MOTOR VEHICLES AND A METHOD FOR BENDING A POWER CABLE FOR MOTOR VEHICLES

CROSS-REFERENCE TO RELATED APPLICATIONS

This application is the national phase entry of international patent application no. PCT/EP2020/072727 filed Aug. 13, 2020 and claims the benefit of German patent application No. 10 2019 130 078.9, filed Nov. 7, 2019, the disclosures of which are incorporated herein by reference in their entirety.

TECHNICAL FIELD

The subject matter relates to a power cable for motor vehicles and a method for bending a power cable for motor vehicles as well as a device for bending a power cable for motor vehicles.

BACKGROUND ART

The use of flat cables, which have a polygonal profile and are formed from a flat conductor made of a solid metallic material insulated with an insulating material, is becoming increasingly popular in automotive applications. In particular, flat cables are increasingly being used for power distribution within a motor vehicle, be it from the battery to the drive train or to the starter, or be it between the generator and the battery or between the starter and the generator, as well as for power distribution within the motor vehicle. Laying the flat cables in the body often requires that they are bent in at least two spatial directions.

A flat cable extends in its longitudinal direction along a longitudinal axis and has at least one wide surface and at least one narrow surface, preferably two wide surfaces lying opposite each other (preferably parallel) and two narrow surfaces lying opposite each other (preferably parallel). A surface normal on the wide surface can be understood as a vertical axis and a surface normal on the narrow surface can be understood as a transverse axis. These two axes can be perpendicular to each other as well as perpendicular to the longitudinal axis.

For laying the flat cable within the motor vehicle, it is bent at least about the vertical axis and/or the transverse axis. Twisting around the longitudinal axis is also possible, but is less common.

Flat cables for power distribution have cable cross sections beyond 50 mm$^2$. Cable cross sections of 100 mm$^2$ and more are quite common. Flat cables are usually pre-assembled for laying in the installation spaces provided for this purpose in the vehicle. For this purpose, the flat cables are already bent during their manufacture. This 3D forming process places particularly high demands on the insulation.

When planning the bending geometries, the mechanical load on the insulation material must always be taken into account. In particular, small bending radii are problematic for the insulation material. Branches along the power cable must also be taken into account by means of appropriate recesses in the insulation. In addition, there may be different temperature requirements for the insulation material along the longitudinal axis of the flat conductor.

Particularly in the case of tight bends with small bending radii around the vertical axis, considerable stresses are placed on the insulation material because the difference between the inner and outer bending radii is considerable, and inner bending radii in particular are much smaller than outer bending radii. This can lead to tearing of the insulation material or strain hardening of the material, both of which are undesirable.

Up to now, this problem has been circumvented by selecting bends, especially around the vertical axis, with bending radii that are still suitable for the insulation material. However, these bending radii, which are then large, limit the flexibility of the flat cable in automotive applications, since the limitation of the bending radius complicates the routing within the vehicle from a source to a consumer and in some cases detours of the flat cable are accepted, which on the one hand require more installation space and on the other hand increase the cable losses due to the longer cable length.

In addition, the material use for longer cables is greater, which leads to additional production costs.

The subject matter was based on the object of providing a power cable for motor vehicles which allows significantly smaller bending radii than has been the case to date.

SUMMARY OF THE INVENTION

A motor vehicle power cable is formed at least from a flat conductor with an at least rectangular profile. The flat conductor is thereby preferably formed from a conductive material, in particular a metallic material. In particular, the flat conductor can be formed from aluminum material or copper material, in particular from an aluminum alloy or a copper alloy. The motor vehicle power cable may further be provided at one or both ends with terminals for the connection to electrical components, such as cable lugs, connection brackets, connection bolts or the like. Further, the automotive power cable may be insulated with an insulating material at least in sections.

The flat conductor extends along a longitudinal axis. The flat conductor has at least one wide surface, preferably two opposite wide surfaces extending preferably parallel to each other, and at least one narrow surface, preferably two opposite narrow surfaces extending preferably parallel to each other. A surface normal of a wide surface may define a vertical axis and a surface normal of a narrow surface may define a transverse axis.

For realizing cable courses within a body of a motor vehicle, bends about the vertical axis are in particular necessary. For these bends, the flat conductor is bent in such a way that an inner as well as an outer bending radius is formed at the wide surface, the inner bending radius being smaller by essentially the dimension of the extension of the flat conductor along the transverse axis. Since the transverse axis runs parallel to the broad surface, the inner bending radius is usually considerably smaller than the outer bending radius, in particular the radii differ by an amount of several centimeters. The inner bending radius runs along an inner side edge of the flat conductor, the outer bending radius runs along an outer side edge of the flat conductor.

In order to prevent the insulation material from being compressed too strongly in the area of the inner bending radius and thus being damaged, it is proposed that the flat conductor has at least one forming about the longitudinal axis in the area of the inner bending radius at its inner side edge arranged at the inner bending radius. By forming around the longitudinal axis in the area of the inner side edge, the free path along the inner bending radius can be increased. This makes it possible to realize tighter bending radii without stress and in a way that is gentle on the material. The material of the flat conductor and, if necessary, the insulation material are specifically deflected into a third plane, i.e. around the longitudinal axis, during forming. The bending forces that occur as a result of bending about the vertical axis are reduced, and the surface pressure that results from bending about the vertical axis is reduced as a result of bending about the longitudinal axis.

As the material of the insulation is less compressed in the area of the inner bending radius due to the forming process, also less material hardening occurs. As a result, the insulation material is more elastic when temperature differences occur. Furthermore, considerably smaller bending radii can be used.

According to one embodiment, it is proposed that the degree of forming decreases from the inner side edge to an outer side edge located at the outer bending radius. That is, the deflection of the forming about the longitudinal axis is preferably maximum in the region of the inner side edge and decreases in the direction of the outer side edge. In particular, the forming is present only from the inner side edge to approximately the region of the center axis of the flat conductor. Starting from the center axis towards the outer side edge, the flat conductor is preferably no longer formed. Since the bending radius increases starting from the inner side edge towards the outer side edge, the forming may decrease starting from the inner side edge towards the outer side edge.

The forming extends from the inner side edge toward the center axis of the flat conductor. It is suggested that the forming extends along an axis perpendicular to the inner side edge. This axis is preferably also perpendicular to the vertical axis and particularly preferably parallel to the transverse axis of the flat conductor.

As already explained, the bending radius increases from the inner side edge towards the outer side edge. Thus, no compression of the insulation material occurs at the outer side edge. According to an embodiment, the forming may end before the outer side edge.

According to an embodiment, it is proposed that the forming is composed of at least two bends about the longitudinal axis which are in opposite directions to each other. In this case, the inner side edge is first bent in a first direction about the longitudinal axis and, at a distance therefrom, is bent in an opposite direction about the longitudinal axis.

According to one embodiment, it is proposed that the forming is composed of intermittent bends about the longitudinal axis in opposite directions to each other. Looking at the flat conductor from the side, the inner side edge preferably runs alternately upwards and downwards.

According to an embodiment example, it is proposed that the forming in a longitudinal section in the area of the inner side edge is corrugated. In this case, the corrugations can be formed in a semi-circular or V-shape or in some other wavy manner.

As already explained at the start, the flat conductor is made of a metallic material. Furthermore, it is preferred that the flat conductor is insulated with an insulation material and that the flat conductor is formed together with the insulation material. Thus, the forming is not only introduced into the material of the flat conductor, but into the material of the insulation material.

Another aspect is a method for bending a motor vehicle power cable, in particular a motor vehicle power cable described above. In this method, first, a flat conductor having a square profile is provided.

The flat conductor extends along a longitudinal axis, with a vertical axis extending along a surface normal of a wide surface and a transverse axis extending along a surface normal of a narrow surface.

In the method, the flat conductor is bent about the vertical axis so that the flat conductor has an inner bend radius and an outer bend radius.

In order to prevent the insulation material from being compressed too strongly in the region of the inner bending radius and material hardening from occurring, it is proposed that the flat conductor be formed about the longitudinal axis in the region of the inner bending radius at its inner side edge located at the inner bending radius. This forming can take place before bending or during bending about the vertical axis. The insulation material can be bent directly with it.

In particular, it is preferred that the flat conductor is first formed and then bent about the vertical axis. The forming along the inner side edge about the longitudinal axis can initially mean a pre-forming. By this, an intended bending line is defined, along which the flat conductor is further formed when bent about the vertical axis. Thus, a bending direction of the forming is pre-defined. If the flat conductor is then bent around the vertical axis, the flat conductor continues to deform at the inner side edge along the initially pre-defined forming. Since the forming has already been introduced, this defines the course of the inner side edge during bending about the vertical axis. The flat conductor and the insulation material are therefore formed in a defined manner about the longitudinal axis, while the flat conductor and the insulation material are bent about the vertical axis.

It is also possible that the bending radius is formed by the introduction of the forming alone. If the flat conductor is formed about the longitudinal axis in the area of the inner side edge, the flat conductor naturally bends about its vertical axis at the same time. This can be used to achieve the forming and the bending in one work step.

For this purpose, it is proposed in particular that the flat conductor is clamped with its opposing broad surfaces between two jaws of a bending tool and that a gap between the jaws is reduced and the flat conductor is formed by the jaws, wherein the jaws have interlocking projections and recesses. In particular, the protrusions and recesses are provided in the area where the inner side edge is positioned between the jaws. If the projections and recesses interlock, they bend the flat conductor about the longitudinal axis, in particular intermittently, preferably in an undulating manner. In the process, the jaws can be pivoted towards each other, for example, so that along the longitudinal axis of the flat conductor, it is pressed-in successively, in particular continuously, between projections and recesses lying one after the other along the longitudinal axis. As a result, the flat conductor is progressively formed along its longitudinal direction at the inner side edge on the one hand and thereby, since the material is pressed out of the longitudinal axis by this forming, also bent about the vertical axis.

In particular, the bending takes place in such a way that the flat conductor is formed at its inner side edge around the longitudinal axis and is not formed at its outer side edge along the longitudinal axis.

By forming at the inner side edge, simultaneously a bending about the vertical axis can result, which is proposed according to an embodiment.

As explained above, the flat conductor may be bent by an appropriate bending tool. Such a bending tool may be formed by two jaws facing each other and having opposite side edges. At these side edges, the jaws may have tooth-like interlocking protrusions and recesses. The jaws and/or the projections and recesses are movable toward each other so that the projections are moved into the recesses to form the flat conductor.

On the other side, the jaws are smooth at two opposite side edges. The inner side edge of the flat conductor contacts with the toothed side edges and the outer side edge of the flat conductor contacts with the smooth side edges.

A bending tool may also have movable pins that extend parallel to a transverse axis and are movable in the direction of the vertical axis. The pins may form the protrusions and/or recesses. On each of two opposing jaws, such pins are arranged intermittently with respect to each other. The jaws may have an arched side edge. The arc can be adapted to the desired bending radius of the flat conductor. A gap can be arranged between the jaws at the curved side edge, and the flat conductor can be inserted into the gap. The pins are arranged at the jaws at angular intervals from one another. Along the arc there can be two, three, five or seven pins per side. The pins are arranged intermittently with respect to each other on one of the jaws respectively.

For forming, the pins are pressed onto the flat conductor. In the process, the pins can be opened and closed in an oscillating manner along the arc. The pins are pressed onto the flat conductor one after the other in a kind of wave motion, in particular wherein at least one pin of each jaw is pressed onto the flat conductor one after the other. The pins can be mounted in such a way that they are moved onto the flat conductor facing away from the side edge or are moved onto the flat conductor facing towards the side edge.

On the side opposite the groove, the flat conductor is mounted on a rail. The rail presses the flat conductor into the groove and prevents the flat conductor from being pushed out of the groove by the movable pins. The rail is preferably flexible and is guided to follow the bending of the flat conductor about the vertical axis. In particular, the flat conductor is supported on the rail via a protective profile made of a plastic material to prevent damage.

The pins are preferably pivoted onto the flat conductor, the pins each being mounted about an axis lying in a plane formed by the transverse axis and the longitudinal axis. During pivoting, the pins are therefore first pressed onto a side edge of the flat conductor.

The pins are preferably encased in a plastic to prevent damage to the flat conductor.

As already explained, on the one hand, the flat conductor can be formed by forming before bending. This forming determines the direction in which the inner side edge moves around the vertical axis during bending. It is also possible that the forming itself bends the flat conductor around the vertical edge at the same time. This simultaneous forming and bending can be done in particular with a device described.

The jaws can be equipped with a star geometry. The two jaws can move together steplessly and thereby also bend the flat conductor during forming.

Unlike usual, the flat conductor is not bent around a mandrel, but is bent simultaneously during forming. By the forming, the inner side edge is bent around the longitudinal axis and the resulting forces cause bending around the vertical axis. This is particularly the case if the forming only takes place in the area of the inner side edge and does not extend over the entire width of the flat conductor.

According to an embodiment, it is proposed that formings succeeding each other along the longitudinal direction have different dimensions from one another about the longitudinal axis. For example, a first forming may have a deflection of the inner side edge by a first dimension, for example a maximum of 0.5 cm offset from the longitudinal axis, and a subsequent forming may have a dimension larger than this, for example 1.5 cm offset from the longitudinal axis. It is also possible that the dimension of the forming along the longitudinal axis first increases and then decreases again.

BRIEF DESCRIPTION OF THE DRAWINGS

In the following, the subject matter is explained in more detail with reference to drawings showing embodiments. The drawings show.

In the following, the subject matter is explained in more detail with reference to a drawing showing embodiments. In the drawing show.

DETAILED DESCRIPTION OF SPECIFIC EMBODIMENTS

Figure 1A:
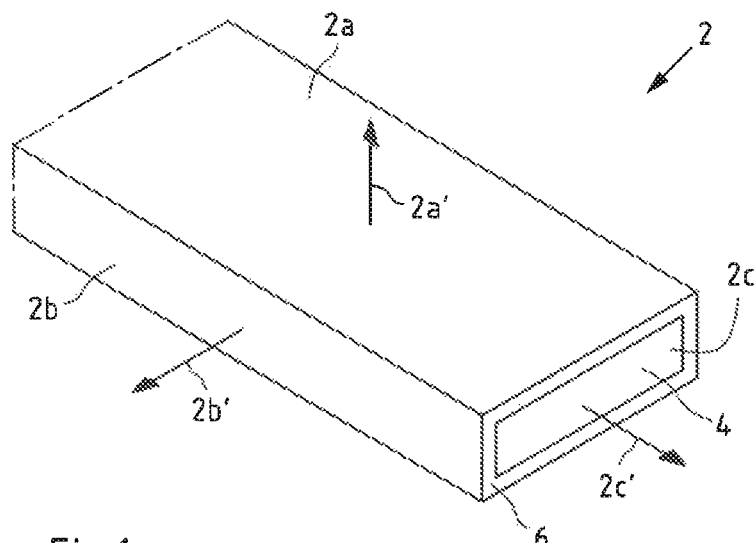
FIG. 1a, b a motor vehicle power cable.

FIG. 1a shows a motor vehicle power cable 2 with a rectangular profile. The motor vehicle power cable 2 is formed of a flat conductor 4 sheathed by an insulating material 6. The motor vehicle power lead 2 has two opposite wide sides 2a and two opposite narrow sides 2b. Further, the motor vehicle power cable 2 has at least one end face 2c. The motor vehicle power cable 2 has a vertical axis 2a', which is a surface normal on the wide side 2a. The motor vehicle power cable 2 has a transverse axis 2b', which is a surface normal on the narrow side 2b. Finally, the motor vehicle power cable 2 extends longitudinally along a longitudinal axis 2c'.

Figure 1B:
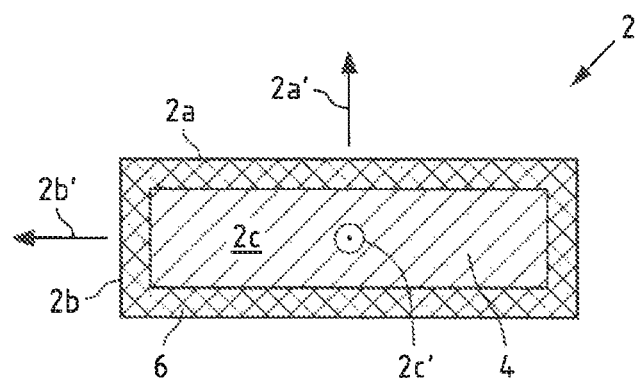

FIG. 1b shows a cross-section of the motor vehicle power cable 2 with the flat conductor 4 as the cable core and the insulation material 6. The perpendicular axes, vertical axis 2a', transverse axis 2b' and longitudinal axis 2c' are also shown. The axes and planes apply equally to the flat conductor 4.

The motor vehicle power cable 2 (and thus also the flat conductor 4 together or without insulation material 6) is usually bent to fit an installation space in a motor vehicle. All embodiments apply to a motor vehicle power cable 2 or the flat conductor 4 alone.

Figure 2:
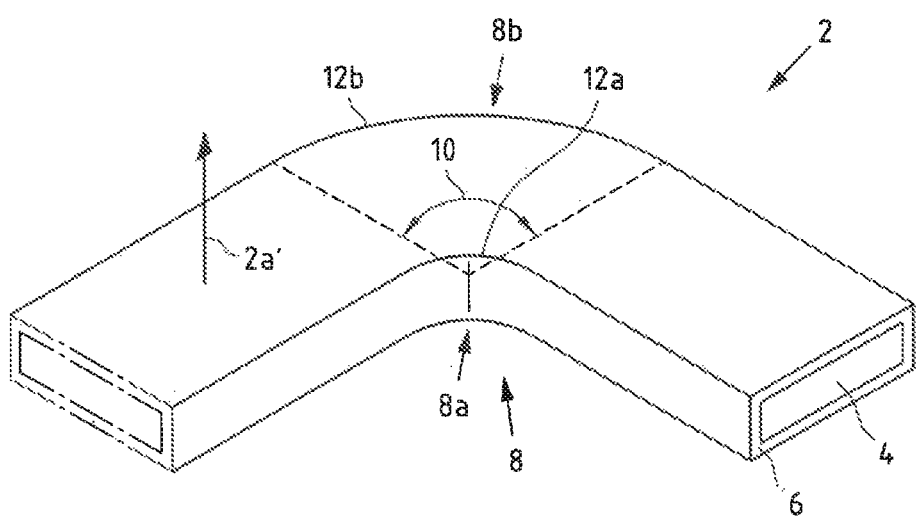
FIG. 2 a motor vehicle power cable bent about the vertical axis.

Bends about the vertical axis 2a' can be made, as shown in FIG. 2. The motor vehicle power cable 2 is bent about the vertical axis 2a' with a bending radius 8 by a bending angle 10. Through this bending about the vertical axis 2a', an inner bending radius 8a and an outer bending radius 8b are formed. In FIG. 2, it can be seen that the inner bending radius 8a is considerably smaller than the outer bending radius 8b.

An inner side edge 12a spans the inner bending radius 8a and an outer side edge 12b spans the outer bending radius 8b. Naturally, the length of the arc at the inner bending radius 8a is shorter than the length of the arc at the outer bending radius. However, this also means that the material of both the flat conductor 4 and the insulation 6 is compressed in the region of the inner bending radius 8a and stretched in the region of the outer bending radius 8b. The compression is particularly problematic, as it leads to material hardening and thus to low elasticity and, if applicable, is more sensitive to temperature fluctuations.

To account for the different length of the circular arcs, it is proposed to form the power cable 2 around the longitudinal axis 2c at the inner bending radius 8a in the area of the inner side edge 12a. The forming results in a forming of the inner side edge 12a in the direction of the vertical axis 2a'. A correspondingly formed inner side edge 12a is shown in FIG. 3a.

Figure 3A:
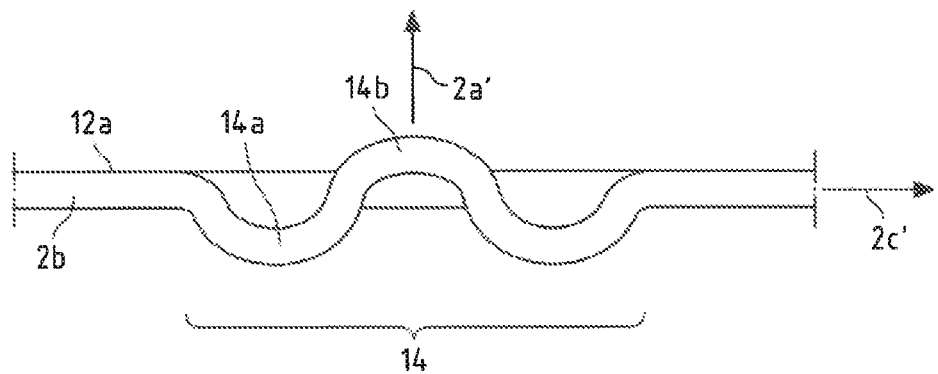
FIG. 3a, b forming at the inner side edge of the flat cable.

FIG. 3a shows a view of the narrow surface 2b. It can be seen that the course in the region of a forming 14 is wave-shaped, with the inner side edge 12a being formed in the direction of the vertical axis 2a', with this forming taking place about the longitudinal axis 2c'. It can be seen that the forming 14 is composed of wave troughs 14a and wave crests 14b, which follow each other. In particular, the forming 14 has intermittent wave troughs 14a and wave crests 14b that are deflected antiparallel to each other, parallel to the vertical axis 2a'.

Figure 3B:
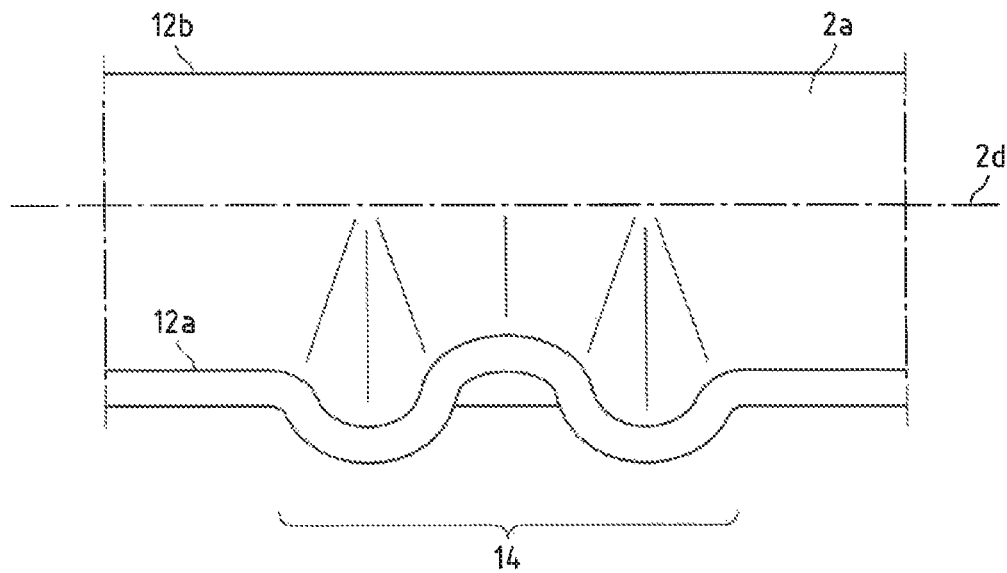

In FIG. 3b, a perspective view of the forming 14 is shown. It can be seen that starting from the inner side edge 12a towards the outer side edge 12b, the forming 14 becomes smaller. In particular, the outer side edge 12b is not formed. In particular, the forming 14 maximally extends to a center axis 2d on the wide surface 2a. Due to the undulating course, the length of the inner side edge 12a is greater than the length of the outer side edge 12b in a formed state. This serves to compensate for the different lengths of the inner side edge 12a and the outer side edge 12b in a bent state, as described in FIG. 2.

As a result of the forming 14, the inner side edge 12a is elongated, as shown in FIG. 4b, so that even when bent about the vertical axis 2a', the compression in the region of the inner side edge 12a of the material of both the flat conductor 4 and the insulation material 6 is reduced.

Figure 5:
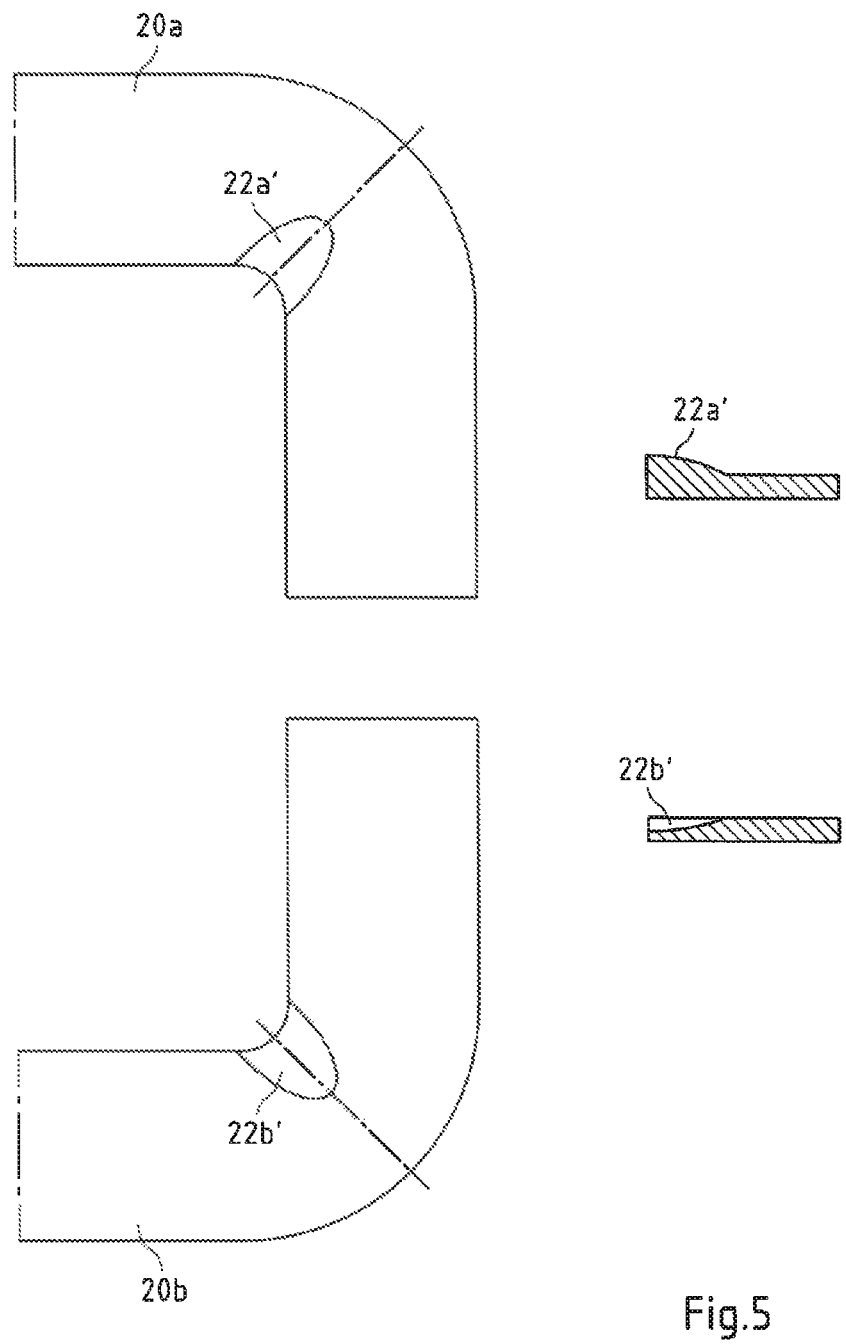
FIG. 5 clamping jaws of a forming tool.

The forming 14 can be introduced into the cable 2 by means of clamping jaws as shown in FIG. 5. In FIG. 5, two clamping jaws 20a, 20b are shown folded apart, with their surfaces joining each other shown. The first clamping jaw 20a may have a projection 22a' in the region of a bend. This projection 22a' can be seen in the sectional view shown on the right. Corresponding to this projection 22a', the second clamping jaw 20b may have a recess 22b'. If the two surfaces 20a, 20b are moved towards each other and the cable 2 lies between them, the projection 22a' presses the cable 2 in the direction of the vertical axis 2a' and thus bends the latter about its longitudinal axis 2c' and introduces the forming 14.

Figure 6:
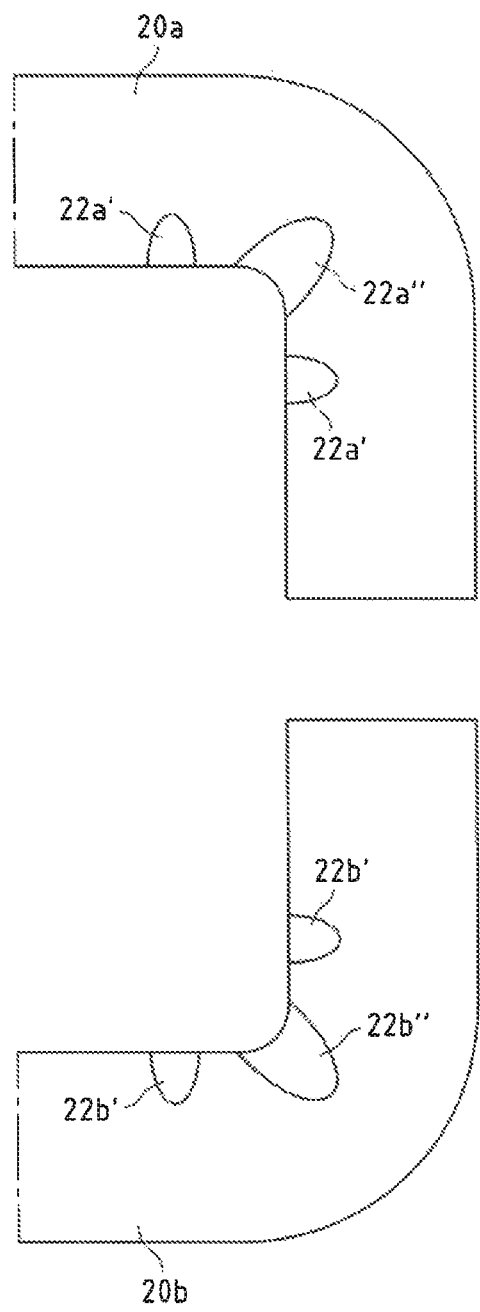
FIG. 6 clamping jaws of a forming tool.

FIG. 6 shows two further clamping jaws 20a, 20b, wherein three projections 22a', 22a" are provided on the first clamping jaw 20a in the region of the inner side edge. The two projections 22a' surround the projection 22a". The projections 22a' have a smaller extension both in the direction of the transverse axis 2b' and in the direction of the vertical axis 2a'. Correspondingly, the second clamping jaw 20b has recesses 22b', 22b" that are complementary to the projections 22a', 22a".

Figure 7:
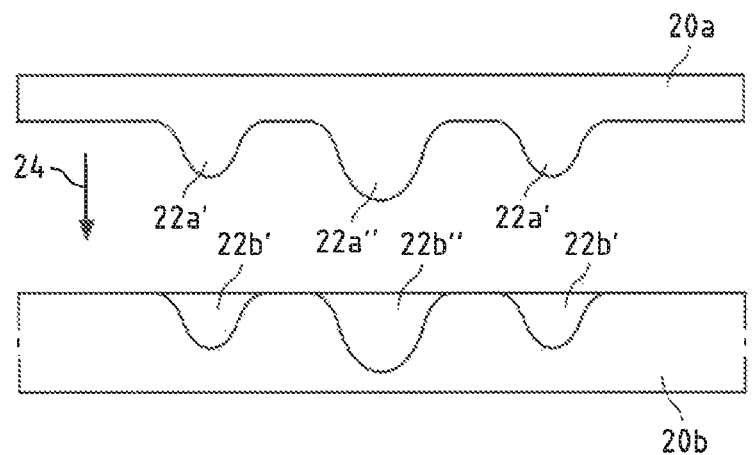
FIG. 7 clamping jaws of a forming tool.

FIG. 7 shows the projections 22a', 22a" and recesses 22b', 22b" in a side view. It can be seen that the projections 22a', a" are complementary to the recesses 22b', b". The clamping jaws 20a, 20b can be moved relative to each other in the direction 24 towards each other and clamp the cable 2. During this clamping, the forming 14 is introduced into the cable 2.

Figure 4:
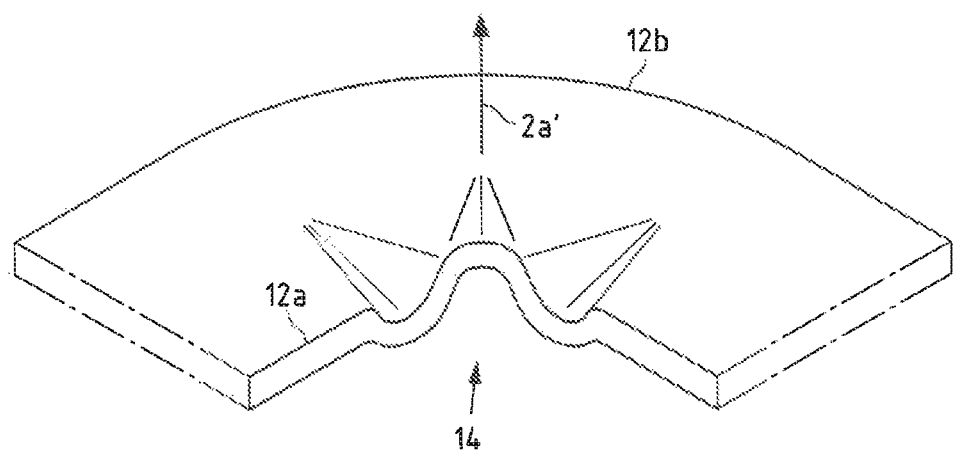
FIG. 4 a formed and bent flat cable.
Figure 8A:
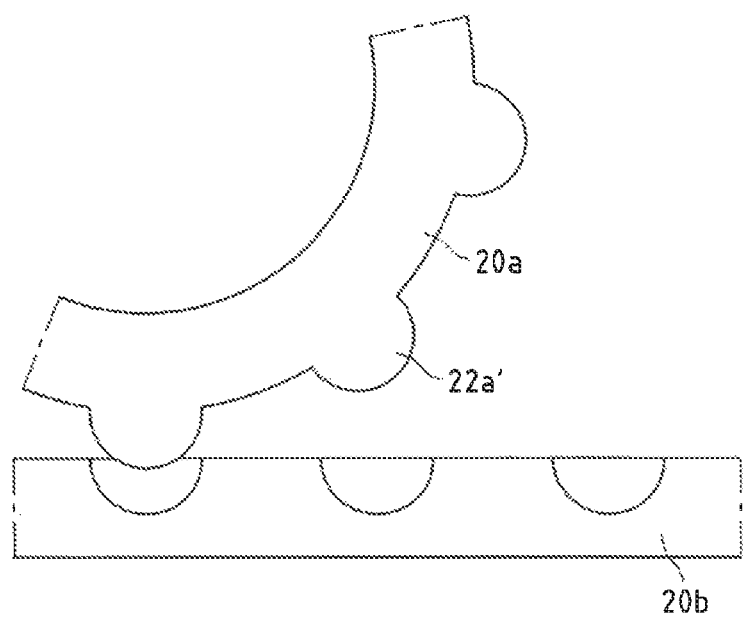
FIG. 8a-c forming and simultaneous bending by a forming tool.
Figure 8B:
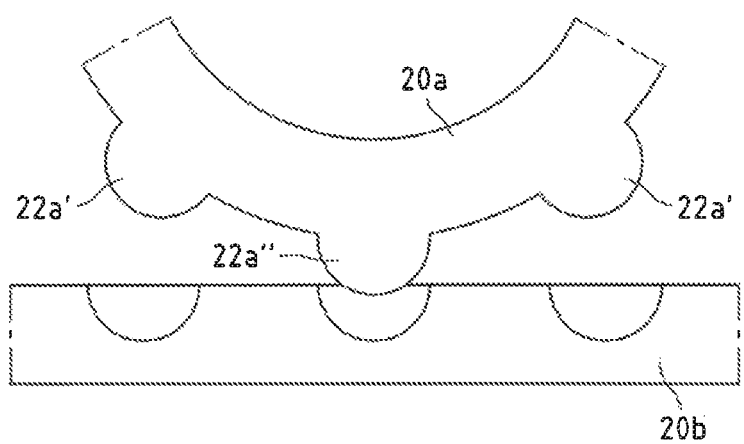
Figure 8C:
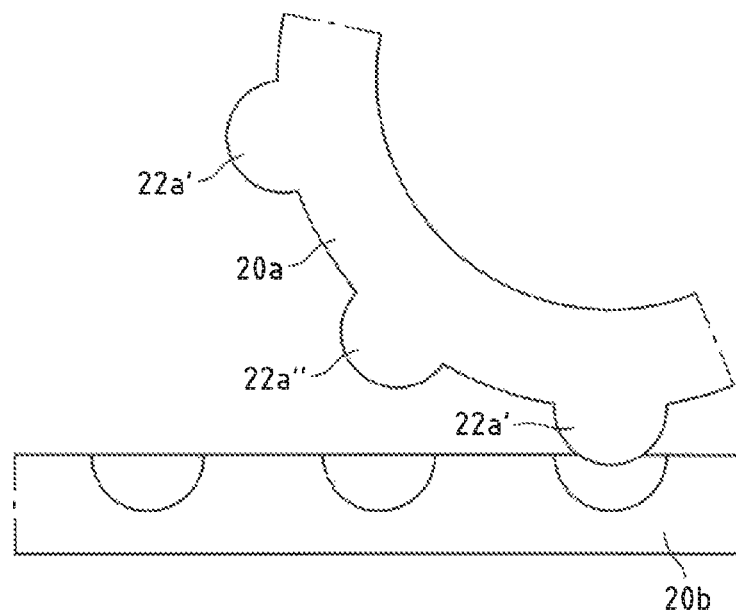

As shown in FIGS. 8a-c, it is also possible for the clamping jaw 20a to be moved in a rolling motion over the clamping jaw 20b and thus, while the forming 14 is being introduced, the power cable 2 is directly formed, as shown in FIG. 4.

In this process, the clamping jaw 20a is moved in the longitudinal direction of the cable 2 starting from a first projection 22a', as shown in FIG. 8a, over a projection 22a" to a projection 22a', as shown in FIG. 8c, over the clamping jaw 20b, wherein a respective projection 22a', 22a" comes into engagement with a recess 22b', 22b".

This projection 22a' can be seen in the sectional view shown on the right. Corresponding to this projection 22a', the second clamping jaw 20b may have a recess 22b'. If the two surfaces 20a, 20b are moved towards each other and the cable 2 is located therebetween, the projection 22a' presses the cable 2 in the direction of the vertical axis 2a' and thus bends the latter about its longitudinal axis 2c' and introduces the forming 14.

Figure 9A:
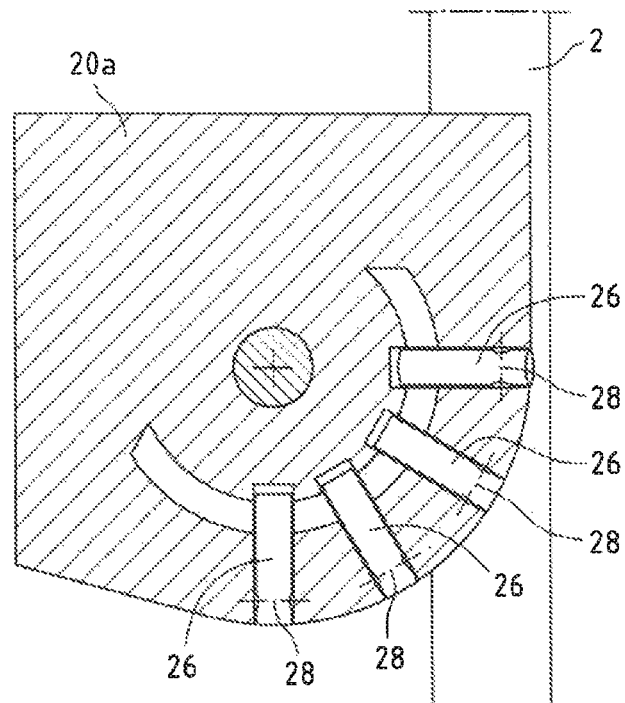
FIG. 9a-c clamping jaws of a forming tool.
Figure 9B:
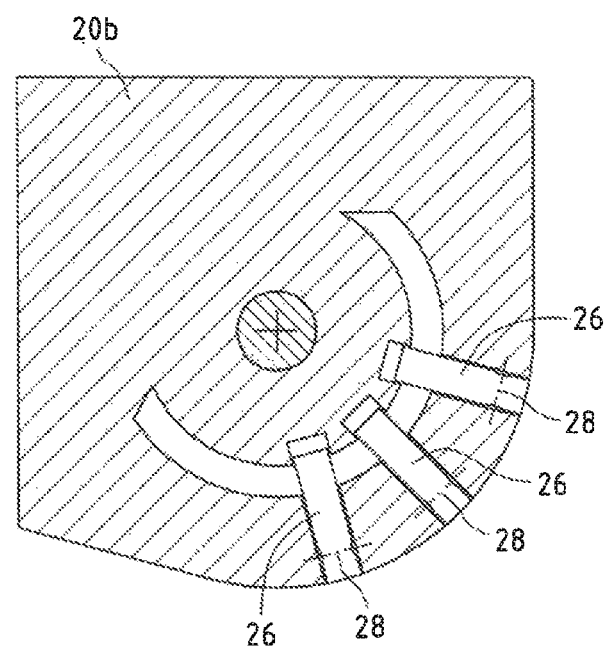

The forming 14 can be introduced into the cable 2 by means of clamping jaws as shown in FIG. 9a, b. In FIG. 9a, b, two clamping jaws 20a, 20b are shown folded apart, with the surfaces abutting each other in the assembled state. The first and second clamping jaws 20a, b may each have pins 26 in the region of a front edge which are angularly spaced from one another. The pins 26 are pivotally arranged at an axis 28 perpendicular to the drawing plane. The axis 28 lies in a plane parallel to the plane spanned by the longitudinal axis 2c' and the transverse axis 2b'. Correspondingly mounted pins 26 can be arranged on the clamping jaw 20b in the spaces between the pins 26 of the clamping jaw 20a. A flat cable 2 can be clamped between the clamping jaws 20a, b and a counter bearing 30.

Figure 9C:
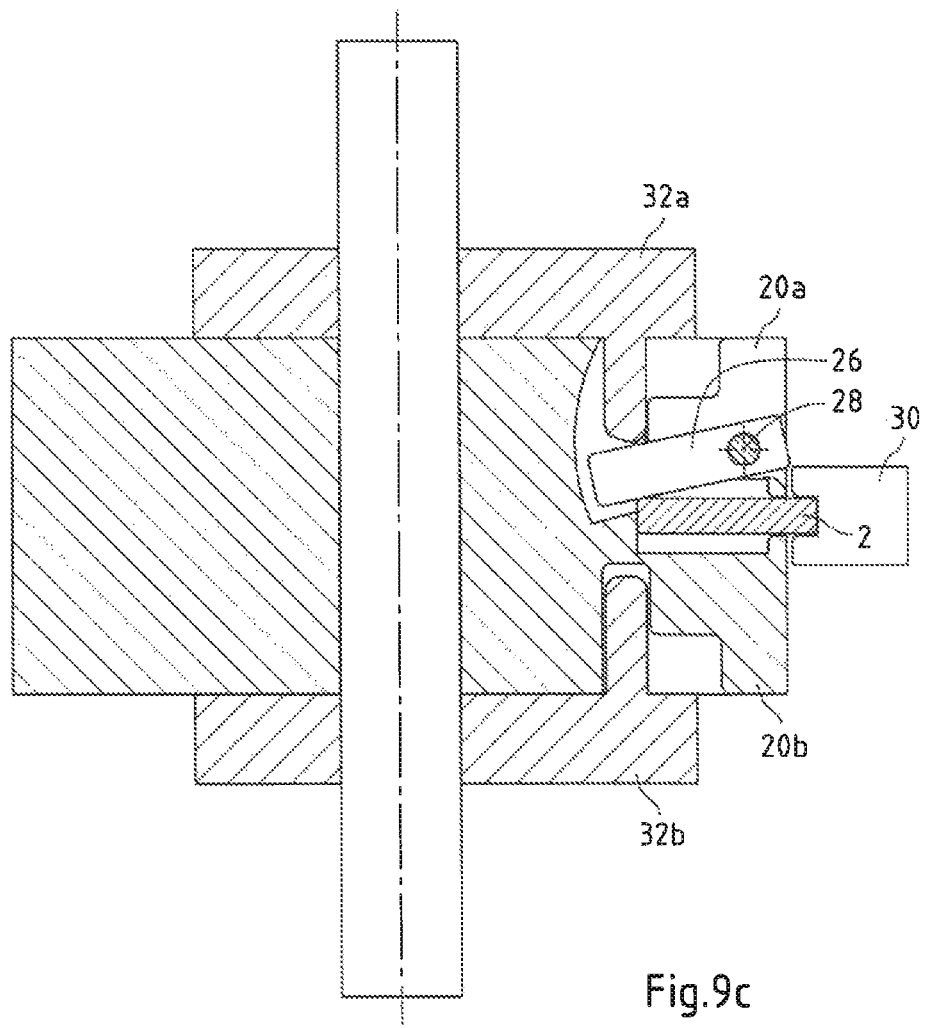
Figure 10A:
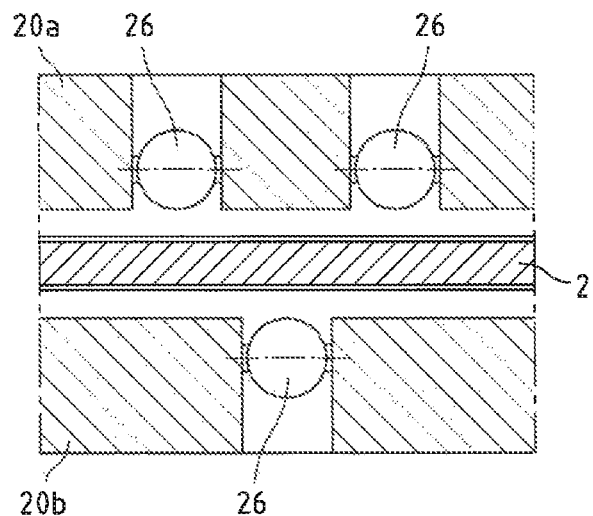
FIG. 10a-d forming and simultaneous bending by a forming tool.
Figure 10B:
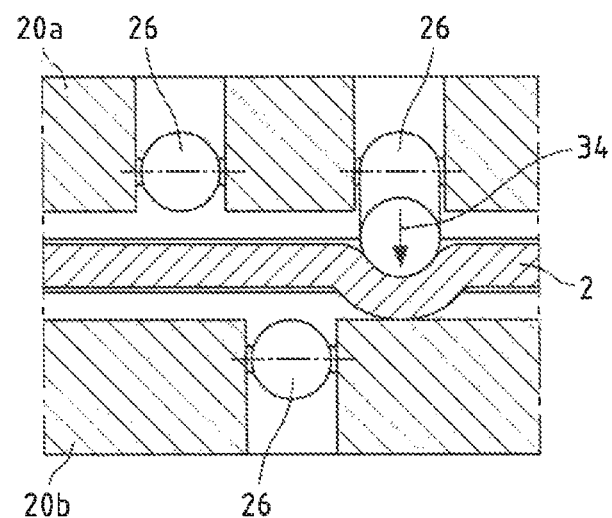
Figure 10C:
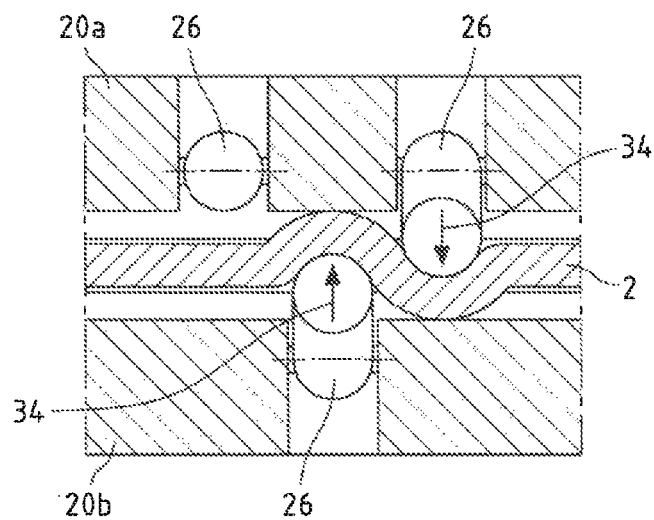
Figure 10D:
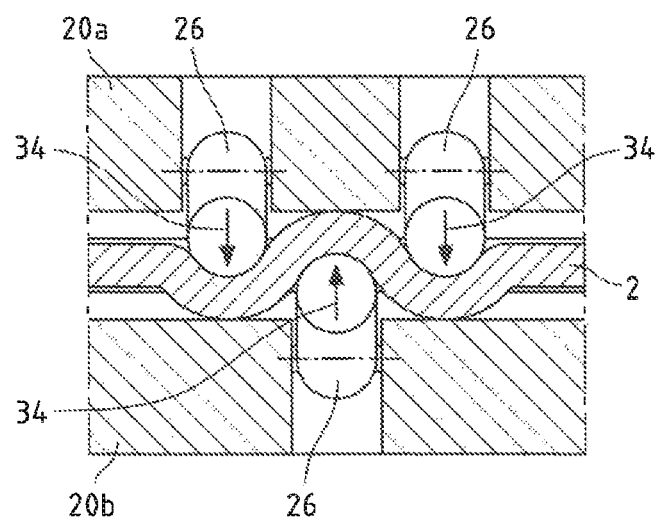

FIG. 9c shows a sectional view through the jaws 20a, 20b. As can be seen, a pin 26 is pivotally mounted about an axis 28. The pin 26 is pressed down by a drive 32a. The same applies to a pin 26 of the lower jaw 20b with a drive 32b. The drives 32a, b perform a pendulum motion so that the pins are pressed successively against the flat conductor 2 at angular intervals.

FIGS. 10a-d show the pins 26 in action. The clamping jaws 20a,b are placed onto each other. A groove 32 between the clamping jaws is formed to receive the flat cable 2. The flat cable 2 is inserted into the groove 32 with a narrow side edge 2b and is held in the groove 32 by the counter bearing 30. Then, the pins 26 are pressed onto the flat conductor 2 in the direction of movement 34. In the process, the pins 26 are moved successively one after the other, in an undulating motion toward the flat conductor 2, as can be seen in the sequence of FIGS. 10a-d. This sequence of movements of FIGS. 10a-d can be repeated several times in succession, so that the flat conductor 2 is formed.

Figure 11A:
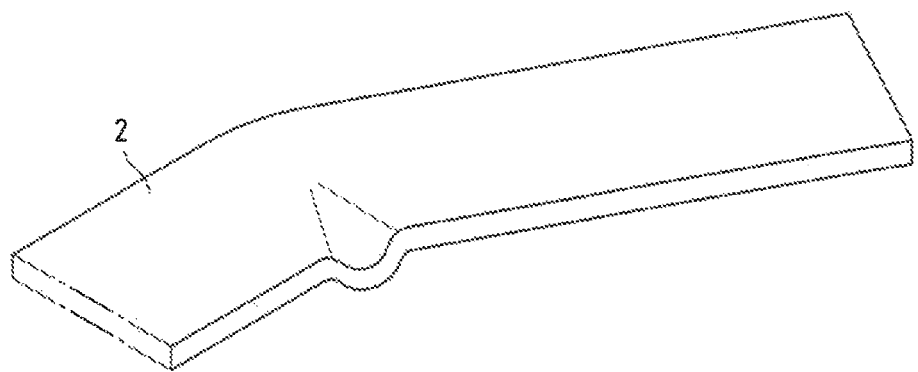
FIG. 11a-c a flat cable during forming and bending according to FIGS. 8a-c and 10a-d, respectively.
Figure 11B:
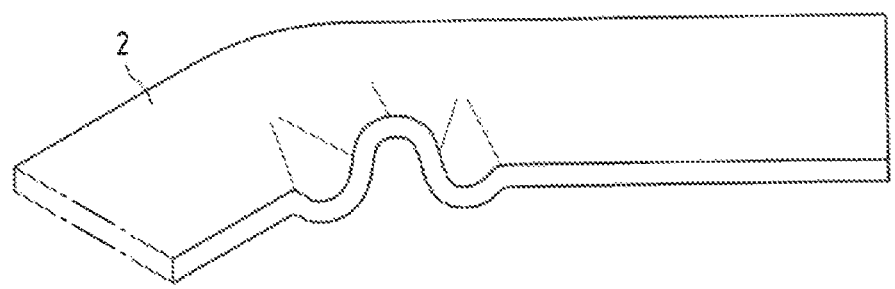
Figure 11C:
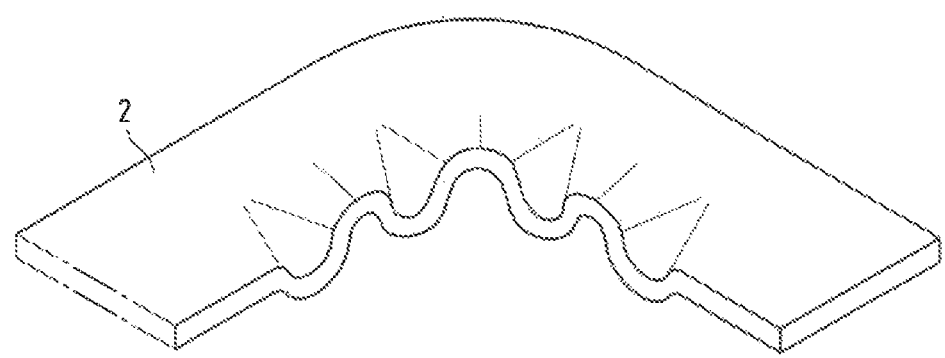

The cable 2 in FIG. 11a corresponds to the cable 2 when it has been bent according to FIG. 8a. The cable 2 in FIG. 11b corresponds to the cable 2 when it has been bent according to FIG. 8b. The cable 2 in FIG. 11 corresponds to the cable 2 when it has been bent according to FIG. 8c. The cable 2 in FIG. 11c also corresponds to the cable 2 if it has been bent according to FIGS. 10a-d, in particular if the pins 26 have been pressed once or multiple times against the cable 2 oscillating manner.

The arrangement described makes it possible to bend a cable 2 without having to wrap it around a mandrel. The compression of the material of the insulation material 6 as well as of the flat conductor 4 is reduced in the area of the inner bending radius 8*a* by the extension of the inner side edge 12*a*.

LIST OF REFERENCE SIGNS

- 2 motor vehicle power cable
- 2*a* wide surface
- 2*b* narrow surface
- 2*a*' vertical axis
- 2*b*' transverse axis
- 2*c*' longitudinal axis
- 4 flat conductor
- 6 insulation material
- 8 bending radius
- 8*a* inner bending radius
- 8*b* outer bending radius
- 10 bending angle
- 12*a* inner side edge
- 12*b* outer side edge
- 14 forming
- 20*a,b* clamping jaw
- 22*a*',a" projection
- 22*b*',b" recess
- 24 direction of motion
- 26 pin
- 28 axis
- 32 groove
- 34 direction of motion

What is claimed is:

1. Motor vehicle power cable comprising:
   a flat conductor having a primarily rectangular profile characterized by two wide surfaces opposite each other and two narrow surfaces opposite each other,
   wherein the flat conductor extends along a longitudinal axis, wherein a vertical axis extends along a surface normal of the wide surfaces of the flat conductor and a transverse axis extends along a surface normal of narrow surfaces of the flat conductor, and the flat conductor is bent about the vertical axis and has an inner bending radius and an outer bending radius,
   wherein in a region of the inner bending radius at an inner side edge arranged at the inner bending radius, the flat conductor has at least one formed section about the longitudinal axis, and,
   wherein before the flat conductor has been bent about the vertical axis, the at least one formed section has been formed with a degree of forming that decreases from the inner side edge to an outer side edge located at the outer bending radius.

2. Motor vehicle power cable according to claim 1, wherein the formed section extends along an axis perpendicular to the inner side edge.

3. Motor vehicle power cable according to claim 1, wherein the formed section ends before the outer side edge.

4. Motor vehicle power cable according to claim 1, wherein the formed section is composed of at least two bends about the longitudinal axis which run in opposite directions to one another.

5. Motor vehicle power cable according to claim 1, wherein the formed section is composed of bends about the longitudinal axis which intermittently run in opposite directions to one another.

6. Motor vehicle power cable according to claim 1, wherein the formed section is undulating in a longitudinal section in the region of the inner side edge.

7. Motor vehicle power cable according to claim 1, wherein the flat conductor is metallic, the flat conductor is insulated with an insulating material, and the flat conductor is formed together with the insulating material.

8. Method of bending a motor vehicle power cable comprising:
   providing a flat conductor having a primarily rectangular profile characterized by two wide surfaces opposite each other and two narrow surfaces opposite each other,
   wherein the flat conductor extends along a longitudinal axis, wherein a vertical axis extends along a surface normal of the wide surfaces of the flat conductor, and a transverse axis extends along a surface normal of the narrow surfaces of the flat conductor, and
   the flat conductor is bent about the vertical axis so that the flat conductor has an inner bending radius and an outer bending radius,
   wherein before the flat conductor is bent about the vertical axis, the flat conductor is formed about the longitudinal axis in a region of the inner bending radius at an inner side edge arranged at the inner bending radius with a degree of forming that decreases from the inner side edge to an outer edge located at the outer bending radius.

9. Method according to claim 8, wherein
   the flat conductor is clamped with its opposite wide surfaces between two jaws of a bending tool,
   a gap between the jaws is reduced and the flat conductor is formed by the jaws, wherein the jaws have interlocking projections and recesses.

10. Method according to claim 8, wherein the flat conductor is formed at its inner side edge about the longitudinal axis and is not formed at its outer side edge along the longitudinal axis.

* * * * *